US012676012B2

(12) United States Patent
Schaefer

(10) Patent No.: US 12,676,012 B2
(45) Date of Patent: Jul. 7, 2026

(54) SYSTEM AND METHOD FOR LANE GRAPH ESTIMATION

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 307 days.

(21) Appl. No.: 18/471,712

(22) Filed: Sep. 21, 2023

(65) Prior Publication Data

US 2025/0104447 A1 Mar. 27, 2025

(51) Int. Cl.
*G06V 20/56* (2022.01)

(52) U.S. Cl.
CPC ................................... *G06V 20/588* (2022.01)

(58) Field of Classification Search
CPC .................................................. G06V 20/588
See application file for complete search history.

(56) References Cited

U.S. PATENT DOCUMENTS

| | | | | |
|---|---|---|---|---|
| 10,260,900 | B2 * | 4/2019 | Becker | G01C 21/30 |
| 10,673,716 | B1 * | 6/2020 | Sethuramalingam | |
| | | | | G06F 16/9024 |
| 10,816,993 | B1 * | 10/2020 | Tran | G06N 3/045 |
| 10,885,452 | B1 * | 1/2021 | Garg | G06N 7/01 |
| 2004/0183663 | A1 * | 9/2004 | Shimakage | G06T 7/73 |
| | | | | 701/1 |

| | | | | |
|---|---|---|---|---|
| 2008/0146713 | A1 * | 6/2008 | Yatake | C08K 5/053 |
| | | | | 347/100 |
| 2011/0296360 | A1 * | 12/2011 | Wang | G06F 30/398 |
| | | | | 716/122 |
| 2012/0216157 | A1 * | 8/2012 | Luo | G06F 30/394 |
| | | | | 716/55 |
| 2014/0132608 | A1 * | 5/2014 | Mund | G01C 21/30 |
| | | | | 345/440 |
| 2018/0365859 | A1 * | 12/2018 | Oba | B60W 40/114 |
| 2019/0084572 | A1 * | 3/2019 | Oishi | B60Q 1/40 |

(Continued)

FOREIGN PATENT DOCUMENTS

CN 106802954 A 6/2017

OTHER PUBLICATIONS

Deng et al., "Generating urban road intersection models from low-frequency GPS trajectory data", International Journal of Geographical Information Science, 2018, pp. 2337-2361, vol. 32, No. 12.

*Primary Examiner* — Solomon G Bezuayehu
(74) *Attorney, Agent, or Firm* — Christopher G. Darrow; Darrow Mustafa PC

(57) ABSTRACT

Systems, methods, and other embodiments described herein relate to estimating a lane graph describing a road portion. In one embodiment, a method includes receiving a frame graph of a road portion. The frame graph has a plurality of cycles, and each cycle is an enclosed configuration of three or more edges. Each edge connects two trace points. Further, each edge has one or more relationship options between the two trace points and a probability value for each of the one or more relationship options. Each trace point is related to a position of a vehicle in the road portion. The method includes estimating, using a maximum likelihood estimation (MLE) process, a lane graph describing the road portion based on at least a portion of the frame graph.

17 Claims, 10 Drawing Sheets

(56) References Cited

U.S. PATENT DOCUMENTS

| | | | | |
|---|---|---|---|---|
| 2019/0384304 A1* | 12/2019 | Towal | ................... | G05D 1/0221 |
| 2020/0249684 A1* | 8/2020 | Onofrio | .................... | G05D 1/65 |
| 2021/0042535 A1* | 2/2021 | Abbott | ...................... | G06T 7/73 |
| 2021/0232832 A1* | 7/2021 | Damerow | ............ | G06N 3/0464 |
| 2021/0253128 A1* | 8/2021 | Nister | .............. | B60W 50/0097 |
| 2022/0063650 A1* | 3/2022 | Takabatake | ............ | B60K 35/81 |
| 2022/0076032 A1* | 3/2022 | Jain | ...................... | G06V 20/588 |
| 2022/0215603 A1* | 7/2022 | Goldman | ........... | G01C 21/3863 |
| 2022/0230019 A1* | 7/2022 | Bande | ................... | G01C 21/188 |
| 2023/0094975 A1* | 3/2023 | Thibaux | ............. | B60W 60/001 |
| 2024/0192019 A1* | 6/2024 | Schaefer | ........... | G01C 21/3811 |
| 2024/0317254 A1* | 9/2024 | Tran | .................... | G06V 20/588 |
| 2025/0104269 A1* | 3/2025 | Schaefer | ............. | G06V 20/588 |
| 2025/0104447 A1* | 3/2025 | Schaefer | ............. | G06V 20/588 |
| 2025/0244141 A1* | 7/2025 | Schaefer | ........... | G01C 21/3815 |
| 2025/0244145 A1* | 7/2025 | Schaefer | ........... | G01C 21/3819 |

* cited by examiner

SYSTEM AND METHOD FOR LANE GRAPH ESTIMATION

TECHNICAL FIELD

The subject matter described herein relates, in general, to systems and methods for estimating a lane graph describing a road portion.

BACKGROUND

Semantic road maps include information about a road, such as the number of lanes, the lane widths, and the lane boundaries of the road. Semantic road maps may facilitate autonomous vehicle operation. However, semantic road maps are typically generated using methods that are both labor and resource intensive.

SUMMARY

In one embodiment, a system for estimating a lane graph describing a road portion is disclosed. The system includes a processor and a memory in communication with the processor. The memory stores machine-readable instructions that, when executed by the processor, cause the processor to receive a frame graph of a road portion. The frame graph has a plurality of cycles, and each cycle is an enclosed configuration of three or more edges. Each edge connects two trace points. Each edge has one or more relationship options between the two trace points and a probability value for each of the one or more relationship options. Each trace point is related to a position of a vehicle in the road portion. The memory stores machine-readable instructions that, when executed by the processor, cause the processor to estimate, using a maximum likelihood estimation process, a lane graph describing the road portion based on at least a portion of the frame graph.

In another embodiment, a method for estimating a lane graph describing a road portion is disclosed. The method includes receiving a frame graph of a road portion. The frame graph has a plurality of cycles, and each cycle is an enclosed configuration of three or more edges. Each edge connects two trace points. Each edge has one or more relationship options between the two trace points and a probability value for each of the one or more relationship options. Each trace point is related to a position of a vehicle in the road portion. The method further includes estimating, using a maximum likelihood estimation process, a lane graph describing the road portion based on at least a portion of the frame graph.

In another embodiment, a non-transitory computer-readable medium for estimating a lane graph describing a road portion is disclosed. The non-transitory computer-readable medium includes instructions that, when executed by a processor, cause the processor to perform one or more functions. The instructions include instructions to receive a frame graph of a road portion. The frame graph has a plurality of cycles, and each cycle is an enclosed configuration of three or more edges. Each edge connects two trace points. Each edge has one or more relationship options between the two trace points and a probability value for each of the one or more relationship options. Each trace point is related to a position of a vehicle in the road portion. The instructions include instructions to estimate, using a maximum likelihood estimation process, a lane graph describing the road portion based on at least a portion of the frame graph.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
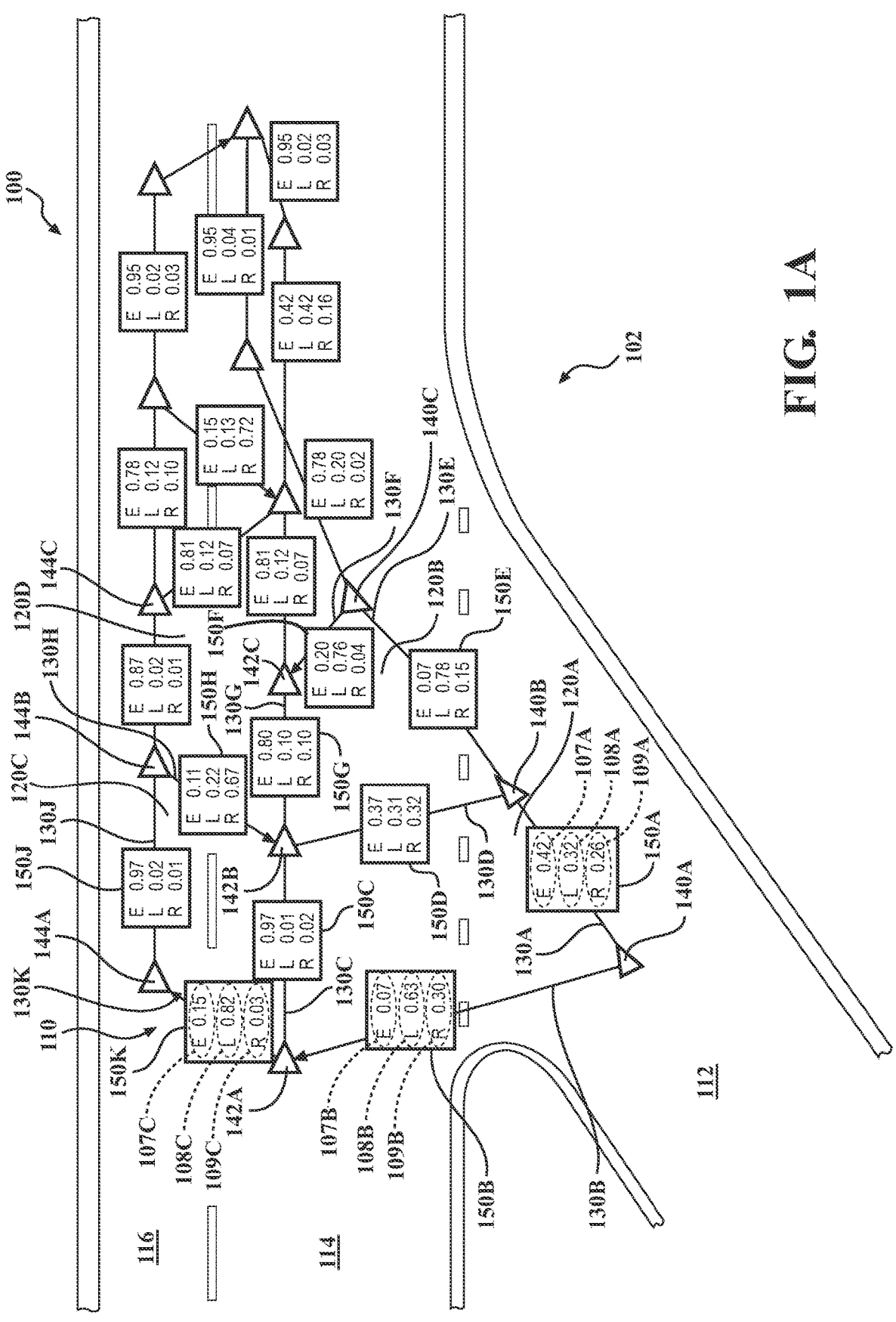
FIGS. 1A-1B illustrate an example of determining a relationship between trace points in a frame graph of a road portion.

Systems, methods, and other embodiments associated with systems and methods for generating a semantic map for a road are disclosed. A semantic map of a road includes the number of lanes along the road, the width of the lanes, the positions of lane markings, lane boundaries, lane edges, and/or intersection of lanes. A road may include single lane roads, multiple lane roads, and intersections. The information included in the semantic map may facilitate autonomous vehicle operation.

As an example, a method to generate a semantic map may include receiving sensor data from vehicle sensors (such as Toyota Safety Sense sensors) as vehicles travel along the road, generating a frame graph based on the sensor data, and then generating a lane graph describing the road based on the frame graph. The positions of the vehicle sensors as the vehicle sensors are capturing sensor data are known as trace points. The frame graph describes the road based on the trace points and probable relationships between the trace points. The relationship may be ego, meaning the two trace points are in the same lane. The relationship may be left adjacent, meaning the two trace points are in adjacent lanes with an edge connecting the two trace points, originating from the trace point on the right and ending at the trace point on the left. The relationship may be right adjacent, meaning the two trace points are in adjacent lanes with an edge connecting the two trace points, originating from the trace point on the left and ending at the trace point on the right. The left and right positions are based on direction of vehicle travel.

The lane graph includes trace points and edges connecting between the trace points. The lane graph further include a resolved relationship between the trace points. In other words, the lane graph includes a selected relationship between the trace points from the probable relationship options. The method may then include generating the semantic map of the road based on ground-truth vehicle trace points and the lane graph.

Current methods of generating and/or estimating the lane graph from a frame graph may result in outliers being incorporated into the lane graph, leading to a high level of inaccuracies. Current methods to identify and/or rectify inconsistencies in the lane graph can be labor-intensive, time-consuming, expensive, and require extensive storage and computational resources as the prior art discloses detecting images, storing the images, and manually identifying and labelling objects and signage detected in the images. Further, prior art discloses generating lane graphs, which often involve significant manual labor, which can be time-consuming and expensive.

Accordingly, systems, methods, and other embodiments associated with estimating a lane graph based on a frame graph are disclosed.

As an example, the system receives a frame graph describing the road from any suitable frame graph generating entity. The system then determines the most probable relationship based on which of the relationship options has the maximum probability. The system then identifies any inconsistencies in the frame graphs and more specifically, in the cycles within the frame graph based on the selected relationship option. The system may identify the inconsistencies using the maximum likelihood estimation (MLE) process and may resolve the inconsistencies by removing an edge of a cycle that is causing the inconsistency. Alternatively and/or additionally, the system may resolve the inconsistency by changing the relationship option of the edge causing the inconsistency and re-evaluating the frame graph and/or the cycle with the updated edge.

The system may include applying a best fit method or MLE process to the frame graph to generate the lane graph. As an example, the best fit method or MLE process may be implemented using a matrix equation as detailed below.

The embodiments disclosed herein present various advantages over conventional technologies that estimate a lane graph. First, the embodiments can provide a more accurate lane graph. Second, the embodiments have low computational complexity and low demand on resources. Third, the embodiments are easy to implement and simplify the process of estimating the lane graph. Fourth, the embodiments may simplify the lane graph, which may be advantageous for data storage and data processing.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1B:
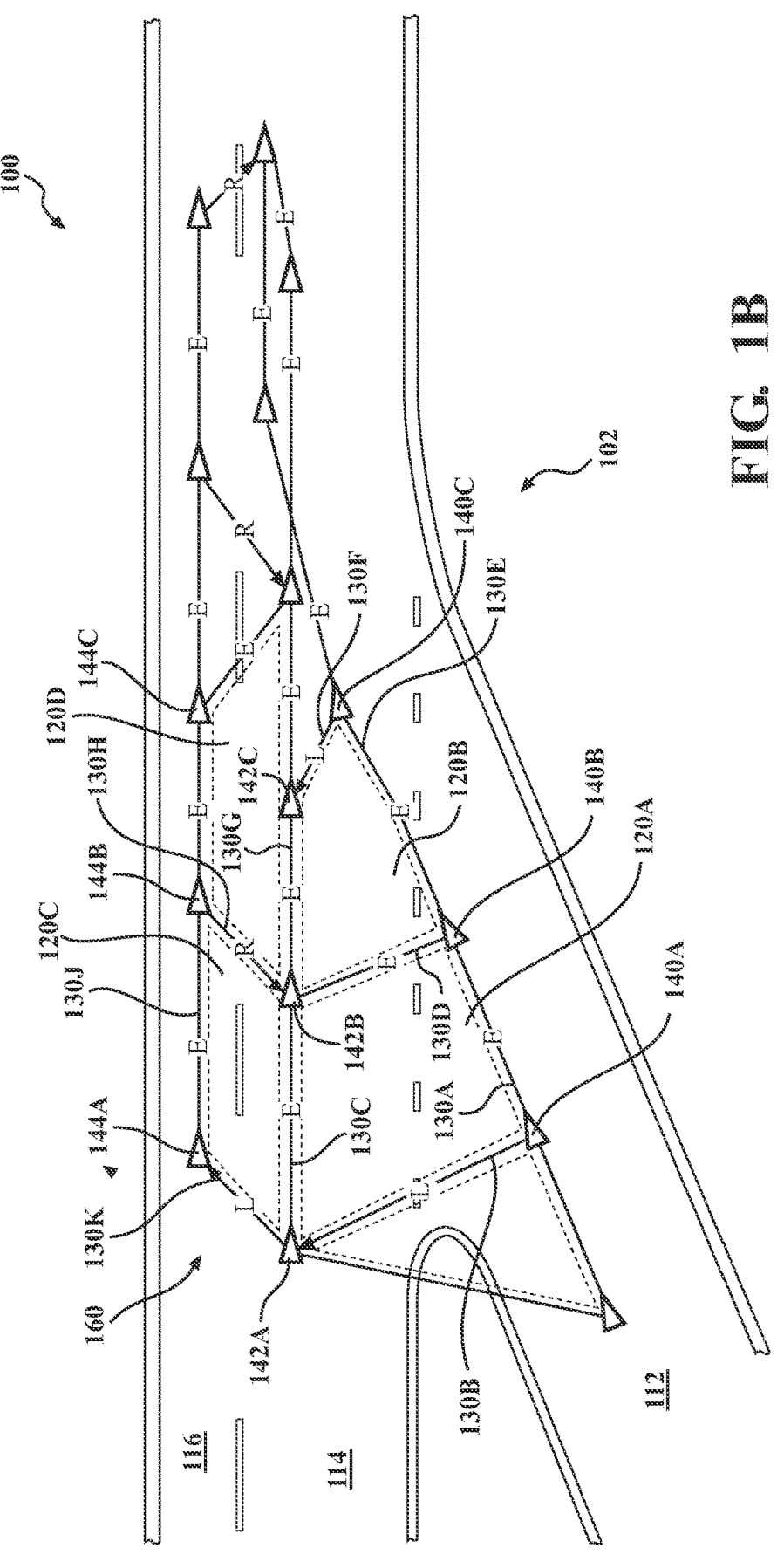

FIGS. 1A-1B illustrate an example of determining a relationship between trace points in a frame graph 110 of a road portion 102. The frame graph 110 has a plurality of cycles 120A, 120B, 120C, 120D (collectively known as 120). Each cycle 120 is an enclosed configuration of three or more edges 130A, 130B, 130C, 130D, 130E, 130F, 130G, 130H, 130J, 130K (collectively known as 130). Each edge 130 connects two trace points 140A, 140B, 140C, 142A, 142B, 142C, 144A, 144B, 144C (collectively known as 140, 142, 144 respectively). The trace points 140, 142, 144 are related to positions of a vehicle in the road portion 102 as the vehicle travels along the road portion 102, collecting sensor data used to create the frame graph 110. Each edge 130 has one or more relationship options 150A, 150B, 150C, 150D, 150E, 150F, 150G, 150H, 150J, 150K (collectively known as 150) between the two trace points 140, 142, 144. The one or more relationship options 150 may include an ego relationship, where the two trace points 140A, 140B are in a same lane 112, a left adjacent relationship, where the two trace points 142A, 144A are in adjacent lanes 114, 116, and the edge 130K originates from the trace point 142A on the right and ends at the trace point 144A on the left, and a right adjacent relationship, where the two trace points 142B, 144B are in adjacent lanes 114, 116, and the edge 130H originated from the trace point 144B on the left and ends at the trace point 142B on the right. The relationship option 150 in which the two trace points are in adjacent lanes may be directional, and the left and right directions are based on the direction in which the vehicle is travelling on the road portion 102. The one or more relationship options 150 may include an other relationship, where the two trace points are not in the same lane or in adjacent lanes. As an example, two trace points that are two lanes apart may have an other relationship since the two trace points do not have an ego relationship or an adjacent relationship. A probability value 107A, 107B, 107C, 108A, 108B, 108C, 109A, 109B, 109C (collectively known as 107, 108, 109 respectively) is associated with each of the one or more relationship options 150. The ego probability value 107 indicates the likelihood that the trace points 140, 142, 144 are in the same lane 112, 114, 116. The left adjacent probability value 108 indicates the likelihood that the trace points 140, 142, 144 are in adjacent lanes 112, 114, 116, and the edges between the trace points are travelling from a right trace point to a left trace point. The right adjacent probability value 109 indicates the likelihood that the trace points 140, 142, 144 are in adjacent lanes 112, 114, 116, and the edges between the trace points are travelling from a left trace point to a right trace point. In a case where the sum of probability values for the ego, left adjacent, and right adjacent relationships do not add up to 1, the difference between the sum and 1 is the probability value for the other relationship.

As an example and as shown in FIG. 1B, a lane graph estimation system 100 can estimate a lane graph 160 describing the road portion 102 based on solving the relationship between trace points 140, 142, 144 by selecting the maximum probability value from the three probability values-ego 107, left adjacent 108, and right adjacent 109, and inferring connecting lines based on the relationship associated with the maximum probability value. As shown, the connecting lines 130 can be marked as E (for ego), L (for left adjacent), or R (for right adjacent) based on the maximum probability value. The lane graph 160 describes and aligns with the lanes 112, 114, 116 in the road portion 102.

Figure 2A:
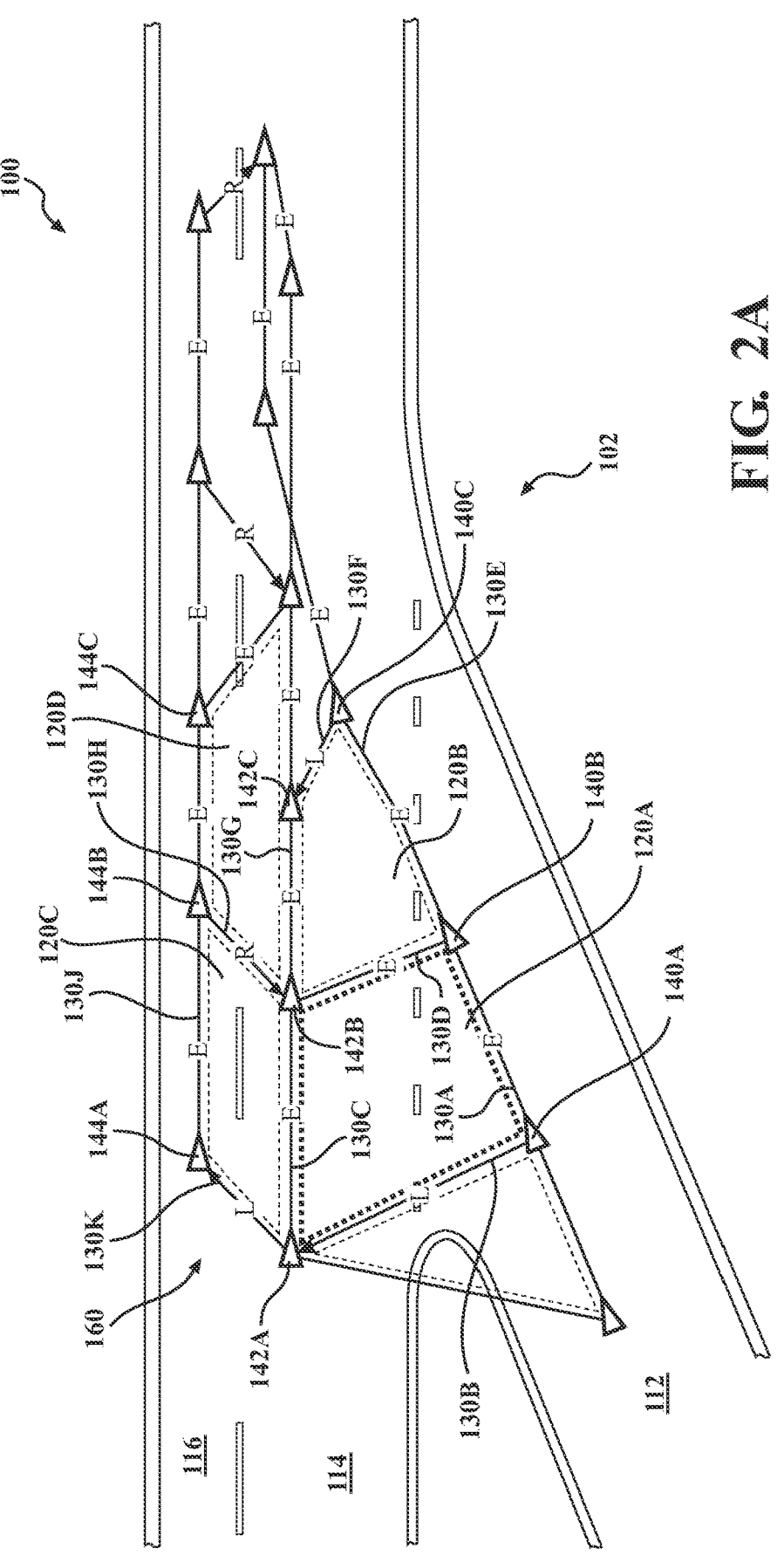
FIGS. 2A-2B illustrate examples of determining a lane graph describing the road portion.
Figure 2B:
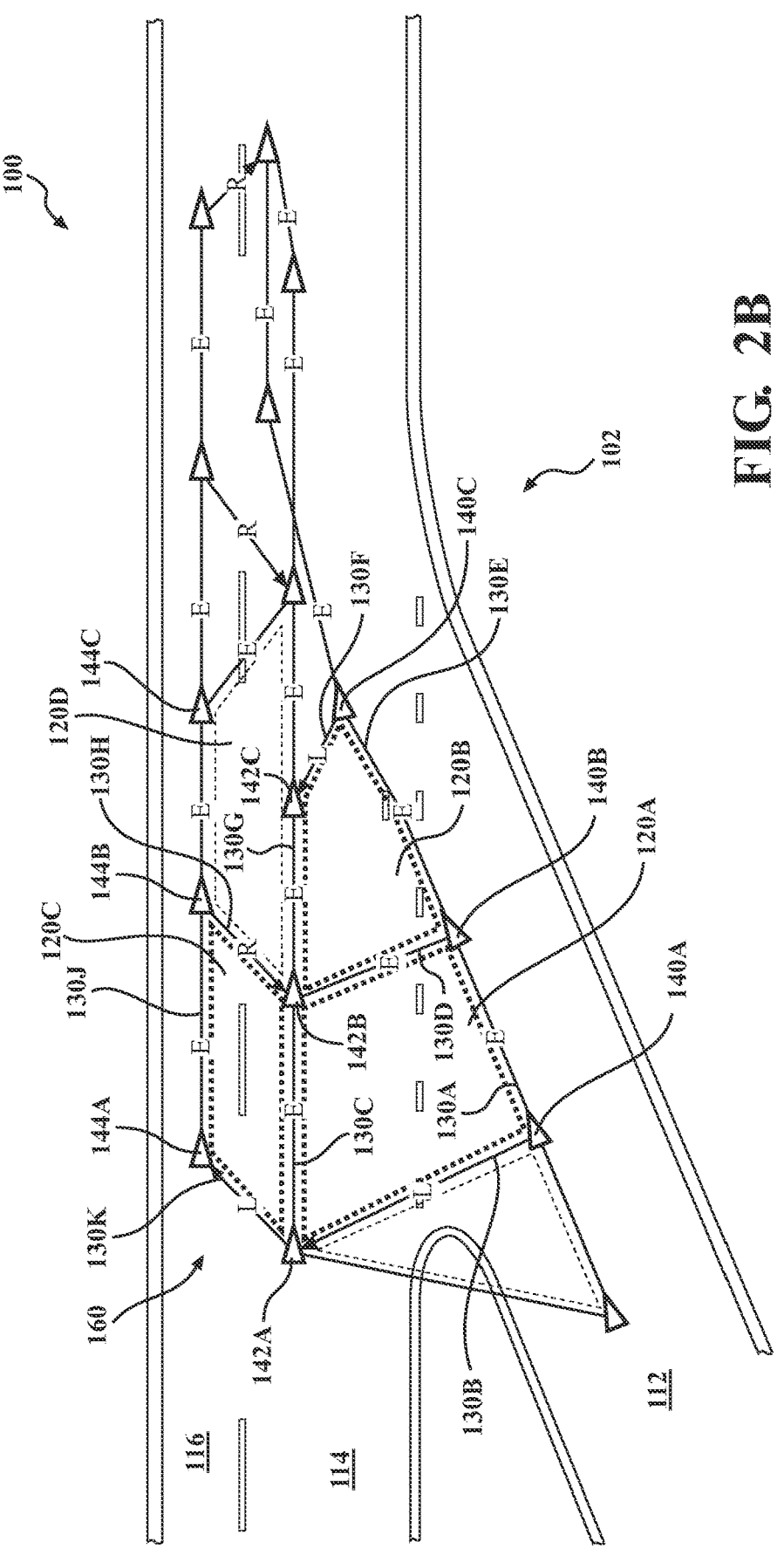

FIGS. 2A-2B illustrate examples of determining a lane graph describing the road portion. The examples include identifying and rectifying an inconsistency in the relationship between two trace points 140B, 142B. As shown, the connecting line 130D indicates an ego relationship between the two trace points 140B, 142B that are in adjacent lanes. A first method and/or a second method described below may be applied to identify and rectify an inconsistency in the relationships between trace points 140B, 142B.

The first method includes assigning a signed integer value to each edge 130 based on whether the edge 130 is an ego relationship, left adjacent relationship, or right adjacent relationship. The magnitude of the integer value assigned to the relationship corresponds to the number lane transitions required to get from one trace point to the other and that the sign of the integer value encodes the direction of the transition. The first method then includes assigning a zero (0) to the edge 130A, 130C, 130D, 130E, 130G, 130J with the ego relationship, assigning a negative one (−1) to the edge 130B, 130F, 130K with the left adjacent relationship, and assigning a plus one (+1) to the edge 130H with right adjacent relationship. The first method then includes summing up the assigned values for the edges 130A, 130B, 130C, 130D of a cycle 120A and comparing the resulting sum to zero. In the case where the resulting sum is zero, there is no inconsistency, and the associated edges 130A, 130B, 130C, 130D are valid. In a case where the resulting sum is a non-zero value, there is an inconsistency, and one of the associated edges 130A, 130B, 130C, 130D is invalid. The first method then includes comparing the maximum probability values 150A, 150B, 150C, 150D for the edges 130A, 130B, 130C, 130D and identifying the edge 130D with the lowest maximum probability value 150D. In one embodiment, the first method includes discarding the edge 130D with the lowest maximum probability value. In another embodiment, the first method includes selecting another relationship for the edge 130D and reprocessing the cycle 120A with the edge 130 assigned to right adjacent relationship, as an example.

Figure 3A:
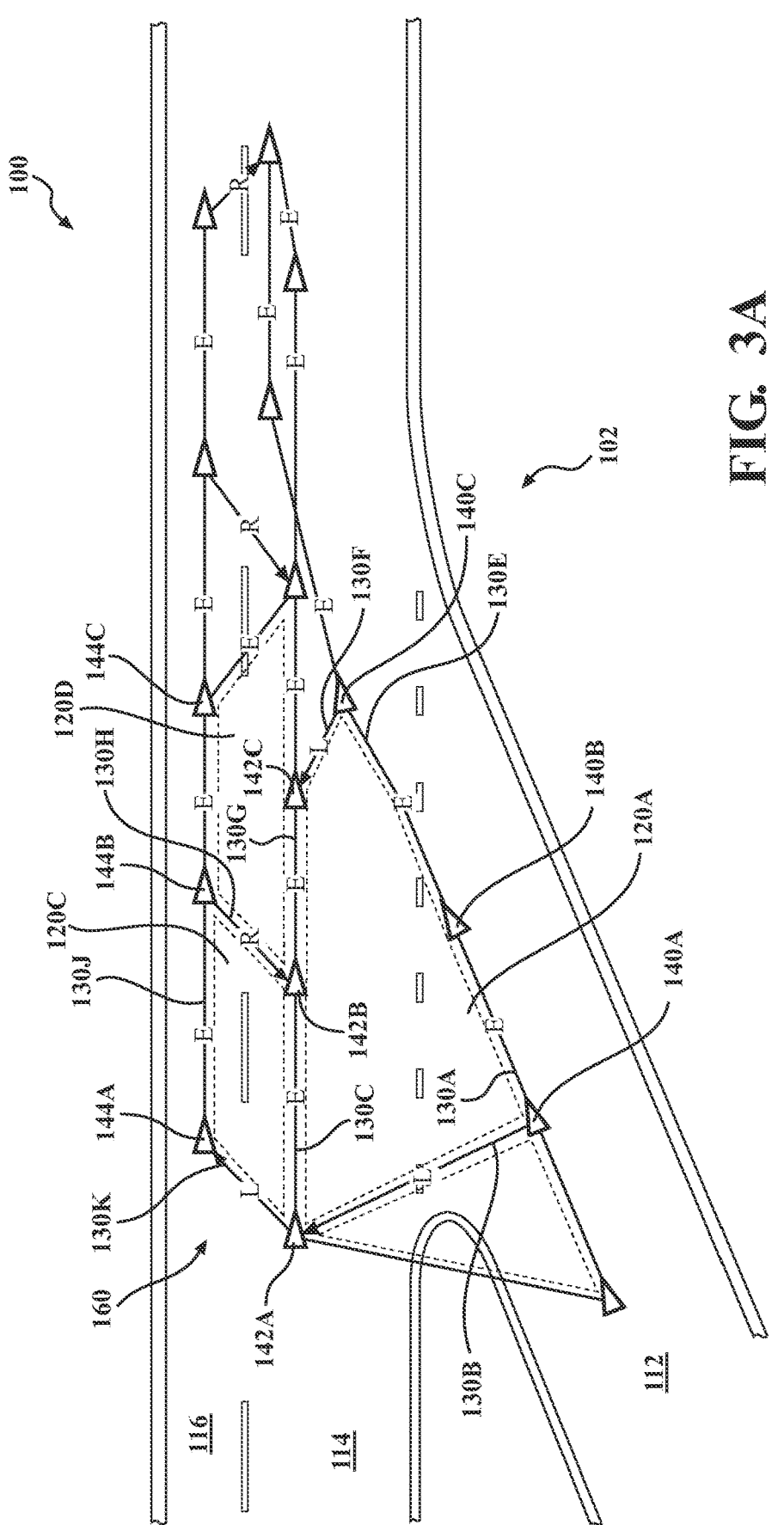
FIGS. 3A-3B illustrates examples in which the lane graph includes an alteration due to an edge with an invalid relationship option.
Figure 3B:
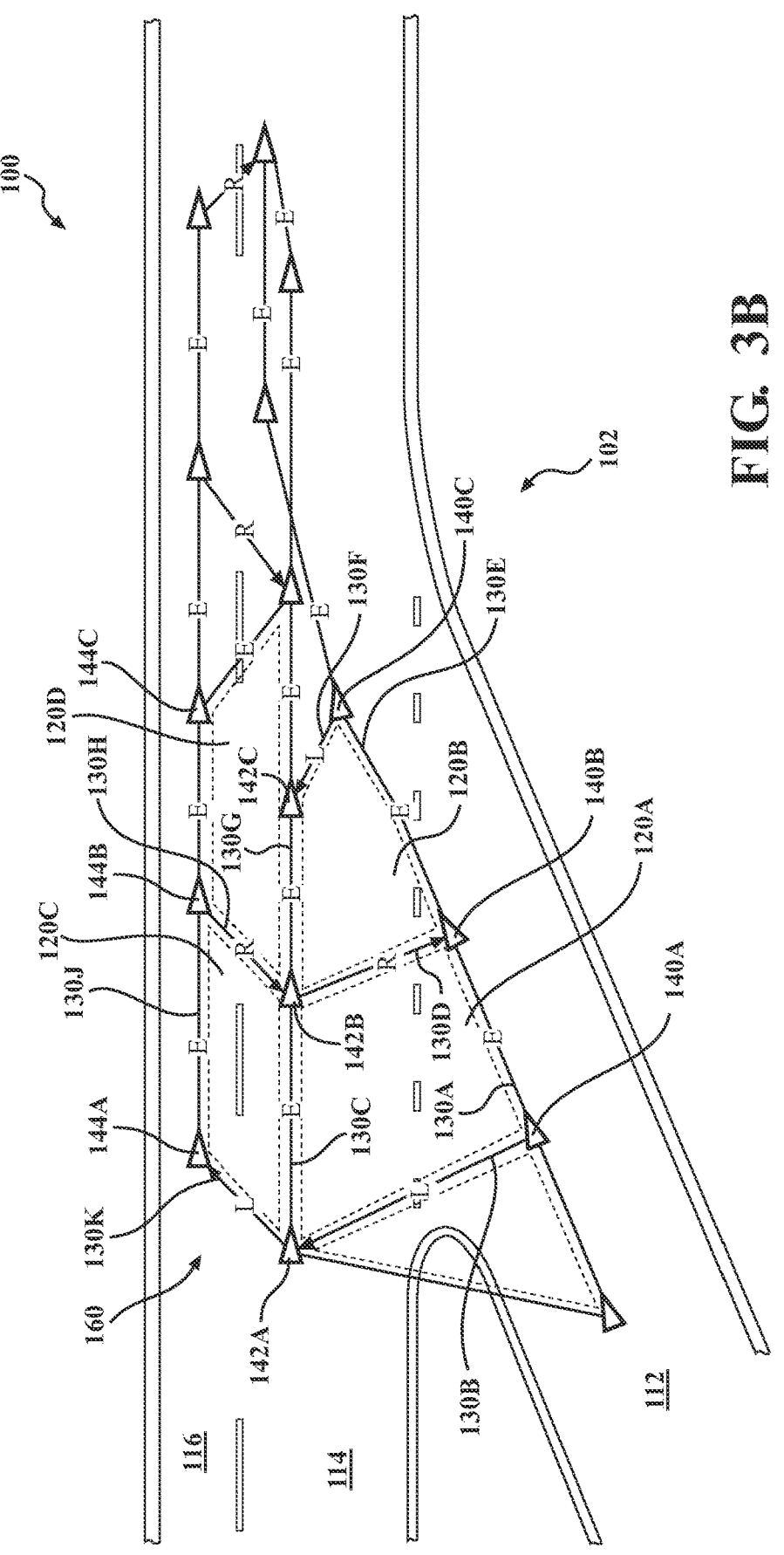

In more detail and as shown in FIG. 2A, to determine whether there is an inconsistency in the cycle 120A, the first method includes assigning 0 to the first edge 130A which is set to E for ego relationship, assigning −1 to the second edge 130B which is set to L for left adjacent relationship, assigning 0 to the third edge 130C which is set to E for ego relationship, and assigning 0 to the fourth edge 130D which is set to E for ego relationship. The first method then includes adding up the four values, resulting in a −1. The first method includes determining that the resulting sum, −1 is not equal to zero and thus, concluding that there is an inconsistency in the cycle 120A. The first method then includes comparing the maximum probabilities 150A, 150B, 150C, 150D for the edges 130A, 130B, 130C, 130D. As an example and as shown, the maximum probability value 150A for the first edge 130A is 0.42 associated with the ego relationship, the maximum probability value 150B for the second edge 130B is 0.63 associated with the left adjacent relationship, the maximum probability value 150C for the third edge 130C is 0.97 associated with the ego relationship, the maximum probability value for the fourth edge 130D is 0.37 associated with the ego relationship. In one embodiment, the first method includes identifying the lowest maximum probability value, which in this example, is 0.37 and discarding the fourth edge 130D which is associated with the lowest maximum probability value, as shown in FIG. 3A. In another embodiment, the first method includes replacing the current relationship of the fourth edge 130D with a different relationship such as left adjacent or right adjacent and applying the first method to the cycle 120A with the updated fourth edge 130D. FIG. 3B shows the fourth edge 130D with the updated right adjacent relationship.

The second method includes assigning a value to each edge 130 based on whether the edge 130 is an ego relationship, left adjacent relationship, or right adjacent relationship. The second method then includes assigning a zero (0) to the edge 130A, 130C, 130D, 130E, 130G, 130J with the ego relationship, assigning a negative one (−1) to the edge 130B, 130F, 130K with the left adjacent relationship, and assigning a plus one (+1) to the edge 130H with right adjacent relationship. The second method then includes summing up the assigned values for the edges of neighboring cycles 120A, 120B, 120C and comparing the resulting sums to zero. In the case where the resulting sum for the cycle 120A is zero, there is no inconsistency, and the associated edges 130A, 130B, 130C, 130D are valid. In a case where the resulting sum for the cycle 120A is a non-zero value, there is an inconsistency, and one of the edges of the cycle 120A is invalid. The second method then determines whether the resulting sum for any of the neighboring cycles 120B, 120C is a zero value or a non-zero value. In one embodiment, the second method includes, in response to the resulting sum for one of the neighboring cycles 120B, 120C being a non-zero value, identifying and discarding the edge 130C, 130D between the cycle 120A and the neighboring cycle 120B, 120C. In another embodiment, the second method includes replacing the current relationship of the invalid edge 130C, 130D with a different relationship and applying the second method to the neighboring cycles 120A, 120B, 120C with the updated edges 130C, 130D.

In more detail and as shown in FIG. 2B, to determine whether there is an inconsistency in a cycle 120A, the second method includes assigning the first edge 130A, the second edge 130B, the third edge 130C, and the fourth edge 130D of the first cycle 120A to −1, 0, 0, and 0, respectively. The second method then includes assigning the first edge 130D, the second edge 130E, the third edge 130F, and the fourth edge 130G of the second cycle 120B to 0, 0, −1, and 0, respectively, and the first edge 130H, the second edge 130J, the third edge 130K, and the fourth edge 130C of the third cycle 120C to 1, 0, −1, and 0, respectively. The second method includes determining that the resulting sum for the first cycle 120A is −1, the resulting sum for the second cycle 120B is −1, and the resulting sum for the third cycle 120C is 0. In one embodiment, the second method then includes identifying and discarding the edge 130D between two neighboring cycles 120A, 120B with non-zero sums, as shown in the lane graph 360 of FIG. 3A. In another embodiment, the second method includes replacing the current relationship of the invalid edge 130D with a different relationship such as right adjacent and applying the second method to the neighboring cycles 120A, 120B with the updated edge 130D. In this example and as shown in FIG. 3B, the sum of the neighboring cycles 120A, 120B with the updated edge 130D are 0 and 0, indicating that the updated edge 130D with the right adjacent relationship is valid.

FIGS. 3A-3B illustrate examples in which the lane graph 310 includes an alteration due to an edge 130D with an invalid relationship option. As shown in FIG. 3A, the invalid edge 130D has been discarded. As shown in FIG. 3B, the invalid edge 130D has been reassigned a different relationship option, which makes the neighboring cycles 120A, 120B valid.

Figure 4A:
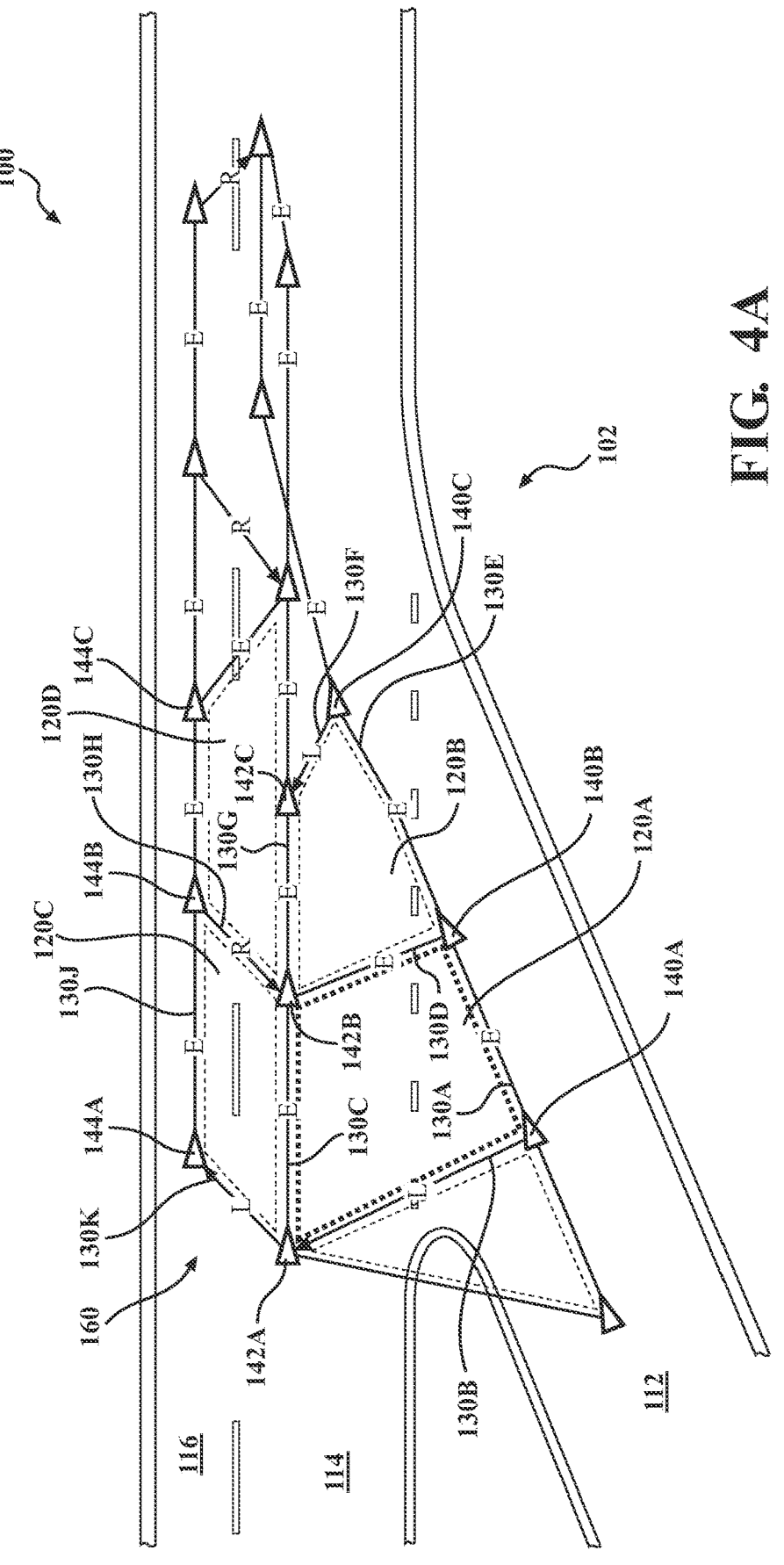
FIG. 4A-4B illustrate another example of generating a lane graph describing the road portion based on determining a best fit.
Figure 4B:
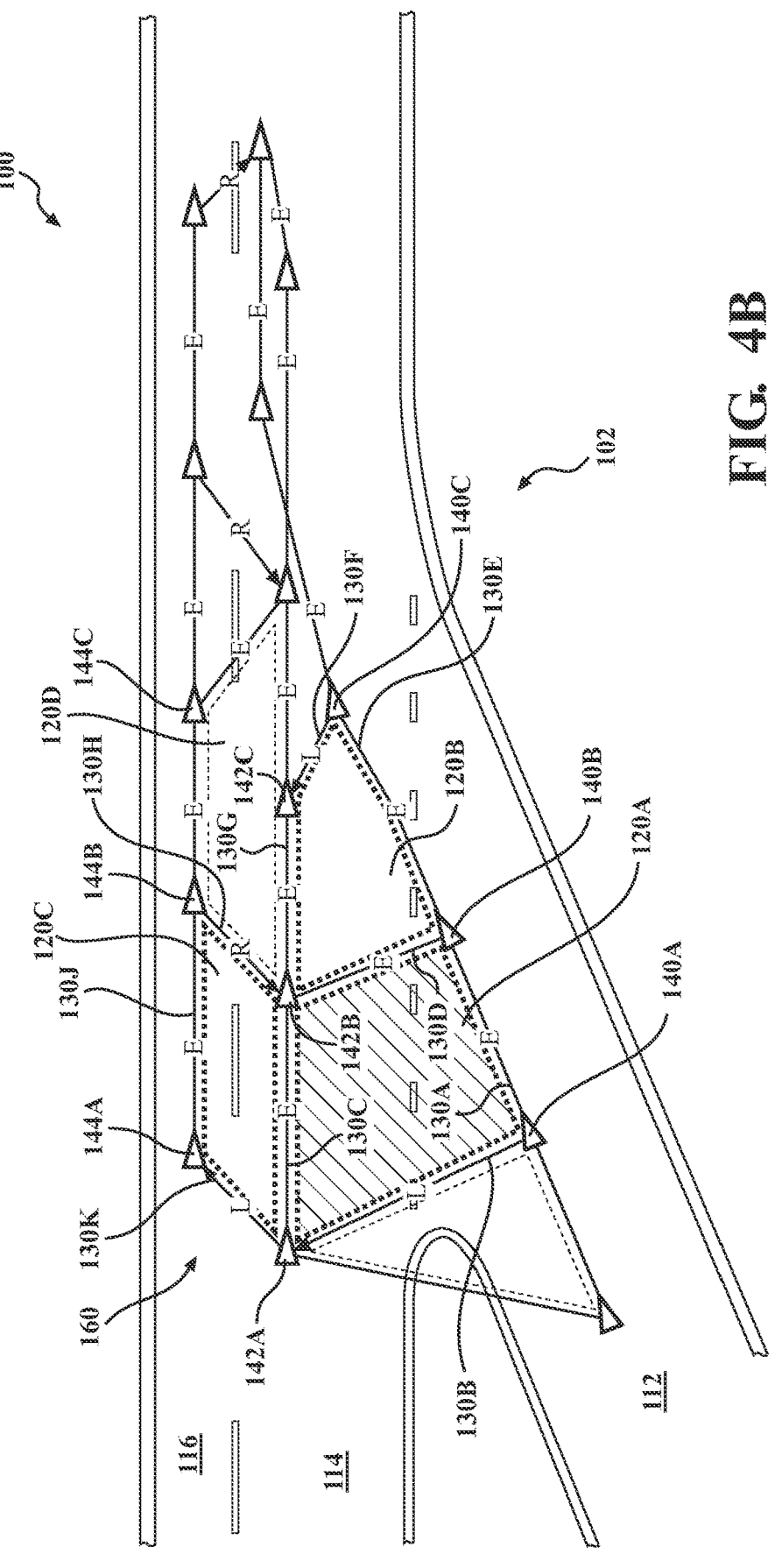

FIGS. 4A-4B illustrate an example of generating a lane graph 310 describing the road portion 102 based on determining a best fit or MLE. The method includes framing the lane graph solving problem as a mixed-integer linear program (MILP), or, more specifically, as a binary linear program. The method includes determining relationships between trace points 140, 142, 144 in a frame graph 110. The method includes selecting one or more cycles 120 to begin the determination process and solving a matrix equation, Ax=y, based on the selected cycles 120. The method includes generating four matrices-a first matrix, A, a second matrix, x, a third matrix, y, and a fourth matrix, c. The first matrix A includes $N_A$ rows by $M_A$ columns, where $N_A$ equals the number $N_E$ of edges 130 of the cycles 120 plus number $N_C$ of cycles 120, and $M_A$ equals the number $N_E$ of edges 130 of the cycles 120 multiplied by the number NR of relationship options 150. The second matrix, x includes $M_A$ rows by 1 column. The third matrix, y includes $N_A$ rows by 1 column. The fourth matrix, c includes $N_E$ rows by 1 column.

Matrices A and y encode two kinds of constraints-a first constraint and a second constraint. The first constraint ensures that each edge 130 is associated with exactly one relationship option 150. The first constraint prevents each edge 130 from being associated with multiple relationship options 150 at the same time. The first constraint also prevents each edge 130 from not being associated with any relationship option 150. The second constraint enforces that each cycle 120 sums up to 0. As previously mentioned, Matrix x is a binary vector of length $M_A$ that indicates which relationship option 150 is active for each edge 130. Matrix y is an integer vector of length $N_A$ that contains $N_E$ ones followed by $N_c$ zeros. While there may be multiple instances of x that satisfy Ax=y, this method seeks the instance x* that maximizes the overall probability of the lane graph 310. This optimization target is encoded in a formula as follows: x*=argmax c'x. In the formula, c'x computes the overall probability of the lane graph 310. Accordingly, c is a real-valued vector of length $N_E$ that reflects the probabilities corresponding to each element of x. In order to compute the overall graph probability, the method includes multiplying the probability values, which is equivalent to summing up the logarithms of the probability values. Consequently, c contains the logarithms of the probability values associated with the $N_E$ elements of x.

The method is further explained with an example. As such and as an example, the method includes selecting one cycle 120A with four edges 130A, 130B, 130C, 130D and generating a matrix equation such as the following:

$$A \quad x = y$$

$$
\begin{bmatrix}
1 & 1 & 1 & 0 & 0 & 0 & 0 & 0 & 0 & 0 & 0 & 0 \\
0 & 0 & 0 & 1 & 1 & 1 & 0 & 0 & 0 & 0 & 0 & 0 \\
0 & 0 & 0 & 0 & 0 & 0 & 1 & 1 & 1 & 0 & 0 & 0 \\
0 & 0 & 0 & 0 & 0 & 0 & 0 & 0 & 0 & 1 & 1 & 1 \\
0 & -1 & 1 & 0 & -1 & 1 & 0 & -1 & 1 & 0 & -1 & 1
\end{bmatrix}
\begin{bmatrix}
x_0 \\ x_1 \\ x_2 \\ x_3 \\ x_4 \\ x_5 \\ x_6 \\ x_7 \\ x_8 \\ x_9 \\ x_{10} \\ x_{11}
\end{bmatrix}
=
\begin{bmatrix}
1 \\ 1 \\ 1 \\ 1 \\ 0
\end{bmatrix}
$$

In this example, there are three relationship options 150, ego, left adjacent, and right adjacent and as previously mentioned, the cycle 120A has four edges 130A, 130B, 130C, 130D. The first matrix, A has 12 columns, 3 columns (based on the three relationship options 150) for each of the four edges 130A, 130B, 130C, 130D. The first matrix, A also includes four top rows that are related to the four edges 130A, 130B, 130C, 130D. The fifth row represents the possible relationship options 150 for each of the four edges 130A, 130B, 130C, 130D. The third matrix, y has five rows and one column. Each of the top four elements in the third matrix, y is set to 1 so as to constrain the x variables, $x_0$-$x_{11}$. As such, in this example, only one of $x_0$, $x_1$, and $x_2$ can be set to 1, only one of $x_3$, $x_4$, and $x_5$ can be set to 1, only one of $x_6$, $x_7$, and $x_8$ can be set to 1, and only one of $x_9$, $x_{10}$, and $x_{11}$ can be set to 1. The fifth element in the third matrix, y is set to 0 such that the sum of the selected relationship options 150 for the four edges 130A, 130B, 130C, 130D (using the constrained x variables) is zero.

The method includes solving for x that meets the constraints of matrices A and y in addition to any other cycles 120 and/or edges 130 that have already been determined and have fixed relationship settings. The method can solve for x using any suitable computational process including machine learning methods and artificial intelligence processes.

The determination may result in one or more possible outcomes for the edges 130 of the first cycle 120A. The method may then progress to determining the edges of a second cycle 120B neighboring the first cycle 120A. The method may further constrain the x variables for the second cycle 120B by the possible outcomes for the edge 130D that is shared by the first cycle 120A and the second cycle 120B.

As an example and as shown in FIG. 4A, the method may include solving the relationship options for the cycles 120 in the frame graph 110 in a sequential manner, starting with solving the relationship options for the edges 130 of a first cycle 120A, and then solving the relationship options for the edges 130 of a second cycle 120B that shares an edge 130D with the first cycle 120A, followed by a third cycle 120C and so on.

As another example and as shown in FIG. 4B, the method may include starting with solving the relationship options for the edges 130 of two or more neighboring cycles 120A, 120B, 120C, and then solving the relationship options for the edges 130 of cycles 120D that share edges with the two or more neighboring cycles 120A, 120B, 120C, followed by another set of cycles.

The aforementioned examples disclose partitioning and solving the MILP in an iterative way. However, more generally, the method can include formulating and solving a single MILP for the whole lane graph 310. Partitioning is advantageous when utilizing limited resources or when it is not desired that inconsistencies in one cycle may be resolved by modifying distant cycles.

Figure 5:
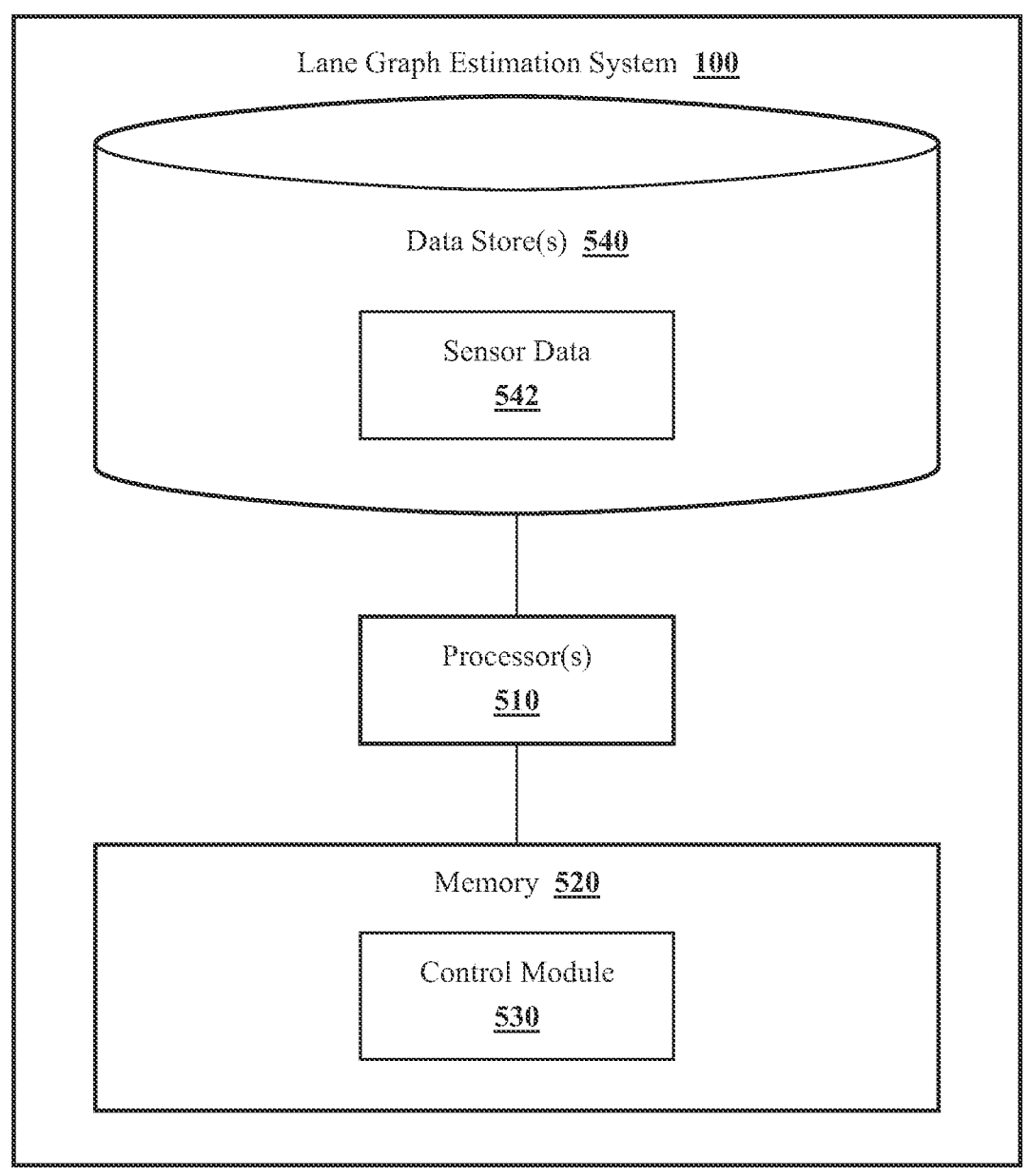
FIG. 5 illustrates an embodiment of a lane graph estimation system for estimating a lane graph based on a frame graph.

FIG. 5 illustrates an embodiment of the lane graph estimation system 100 for estimating the lane graph 310 based on the frame graph 110. One embodiment of the lane graph estimation system 100 may implement the one or more of the methods in FIGS. 1A-4B. The lane graph estimation system 100 is shown as including a processor 510. Accordingly, the processor 510 may be a part of the lane graph estimation system 100, or the lane graph estimation system 100 may access the processor 510 through a data bus or another communication path. In one or more embodiments, the processor 510 is an application-specific integrated circuit (ASIC) that is configured to implement functions associated with a control module 530. In general, the processor 510 is an electronic processor, such as a microprocessor, which is capable of performing various functions as described herein.

In one embodiment, the lane graph estimation system 100 includes a memory 520 that stores the control module 530 and/or other modules that may function in support of estimating a lane graph describing a road portion. The memory 520 is a random-access memory (RAM), read-only memory (ROM), a hard disk drive, a flash memory, or another suitable memory for storing the control module 530. The control module 530 is, for example, machine-readable instructions that, when executed by the processor 510, cause the processor 510 to perform the various functions disclosed herein. In further arrangements, the control module 530 is a logic, integrated circuit, or another device for performing the noted functions that includes the instructions integrated therein.

Furthermore, in one embodiment, the lane graph estimation system 100 includes a data store 540. The data store 540 is, in one arrangement, an electronic data structure stored in the memory 520 or another data store, and that is configured with routines that can be executed by the processor 510 for analyzing stored data, providing stored data, organizing stored data, and so on. Thus, in one embodiment, the data store 540 stores data used by the control module 530 in executing various functions.

For example, as depicted in FIG. 5, the data store 540 includes the frame graph data 542 along with, for example, other information that is used and/or produced by the control module 530. The frame graph data 542 includes information about the frame graph 110, vehicle direction, the cycles 120, the edges 130, the trace points 140, 142, 144, the relationship options 150, and associated probabilities 107, 108, 109.

While the lane graph estimation system 100 is illustrated as including the various data elements, it should be appreciated that one or more of the illustrated data elements may not be included within the data store 540 in various implementations and may be included in a data store that is external to the lane graph estimation system 100. In any case, the lane graph estimation system 100 stores various data elements in the data store 540 to support functions of the control module 530.

In one embodiment, the control module 530 includes instructions that, when executed by the processor(s) 510, cause the processor(s) 510 to receive a frame graph 110 of a road portion 102. The frame graph 110 includes a plurality of cycles 120. Each cycle 120 is an enclosed configuration of three or more edges 130. Each edge 120 connects two trace points 140, 142, 144. Each edge 130 has one or more relationship options 150 between the two trace points 140 and a probability value 107, 108, 109 for each of the relationship options 150. Each trace point 140, 142, 144 is related to a position of a vehicle in the road portion 102. In one or more arrangements, the control module 530 may receive the frame graph data 542 from any suitable entity capable of generating a frame graph 110. The frame graph 110 describes the road portion 102 using the cycles 120, the edges 130, the trace points 140, 142, 144 the relationship options 150, and the associated probabilities 107, 108, 109.

The relationship options 150 between the trace points 140, 142, 144 include two trace points in the same lane, two trace points in adjacent lanes leftward, or two trace points in adjacent lanes rightward. The relationship between two trace points 140, 142, 144 in the same lane is referred to as ego. The edges 130 between trace points 140, 142, 144 when the trace points 140, 142, 144 are in adjacent lanes may be directional. Directional edges originate from one trace point 140, 142, 144 and end at the other trace point 140, 142, 144. The relationship between two trace points 140, 142, 144 in the adjacent lane leftward, also known as left adjacent, refers to an edge 130 originating from a right trace point 140, 142, 144 in one lane and ending at a left trace point 140, 142, 144 in an adjacent lane. The relationship between two trace points 140, 142, 144 in the adjacent lane rightward, also known as right adjacent, refers to an edge 130 originating from a left trace point 140, 142, 144 in one lane and ending at a right trace point 140, 142, 144 in an adjacent lane. The left and right directions are relative to the direction in which a vehicle and/or vehicle sensors are travelling. The frame graph 110 is generated based on sensor data collected by the vehicle and/or the vehicle sensors travelling on the road portion 102.

In one embodiment, the control module 530 includes instructions that, when executed by the processor(s) 510, cause the processor(s) 510 to estimate, using a MLE process, a lane graph 310 describing the road portion 102 based on at least a portion of the frame graph 110. The MLE process includes computing the cycle basis of the frame graph 110. Cycle basis is based on a sum of all the simple cycles in the frame graph 110.

In one or more arrangements, the control module 530 applies MLE to the frame graph 110 so as to estimate and thus, determine the lane graph 310. The overall goal of the MLE process is to find a solution that maximizes the overall graph probability and/or likelihood. As an example, the control module 530 labels the edges 130 of the frame graph 110 and assigns values to the edges 130 based on the label. The control module 530 then sums up the values associated with the edges 130 and makes a determination about the validity of the cycle 120 and the frame graph 110.

The lane graph 310 is a configuration that describes the positioning of lanes 112, 114, 116 in the road portion 102 based on trace points 140, 142, 144 and edges 130 between the trace points 140, 142, 144. Each edge 130 in the lane graph 310 is assigned one of the relationship options 150— ego, left adjacent, or right adjacent. In some arrangements, the edge 130 in the lane graph 310 may be assigned other, indicating that the two trace points 140, 142, 144 connected by the edge 130 are in not in the same lane or adjacent lanes.

The control module 530 may determine the lane graph 310 from the frame graph 110 by determining the relationship between the trace points 140, 142, 144 in the frame graph 110. As such, the control module 530 may determine whether the trace points 140, 142, 144 have an ego relationship, an adjacent left relationship, or an adjacent right relationship based on which of the three relationships has the maximum probability. The control module 530 may then generate the lane graph 310 with edges 130 and trace points 140, 142, 144 based on the relationship options with the maximum probability.

In one embodiment, the control module 530 includes instructions that, when executed by the processor(s) 510, cause the processor(s) 510 to determine validity of at least one cycle 120 based on the three or more edges 130 of the at least one cycle 120. As an example, the control module 530 may assign a relationship option to each edge 130 of the frame graph 110 and then determine whether each cycle 120 of the frame graph 110 is valid based on the assigned relationship of the edges 130. In such an example and as previously disclosed, the control module 530 may assign values to the edges 130 in each cycle 120 based on the associated relationship and then sum up the values of the edges 130 in each cycle 120. The control module 530 may compare the sum to a predetermined value and if the sum equals the predetermined value, the control module 530 may conclude that the cycle 120 is valid. In the case that the control module 530 determines that the sum does not equal the predetermined value, the control module 530 may determine that the cycle 120 has an inconsistency and thus, is invalid. As an example and as previously disclosed, the control module 530 may assign 0 to ego edges, −1 to adjacent left edges, and +1 to adjacent right edges. The control module 530 may then sum up the assigned values within a cycle 120 and compare the sum to a predetermined value such as zero. In the case that the sum equals zero, the control module 530 may determine that the cycle 120 is valid, and in the case that the sum does not equal zero, the control module 530 may determine that the cycle 120 is invalid.

In one embodiment, the control module 530 includes instructions that, when executed by the processor(s) 510, cause the processor(s) 510 to determine validity of at least one of the cycles 120 based on the three or more edges 130 of the at least one of the cycles 120 and at least one neighboring cycle 120 that shares at least one of the three or more edges 130. As an example, the control module 530 may assign a relationship option to each edge 130 of the frame graph 110 and then determine whether neighboring cycles 120 of the frame graph 110 are valid based on the assigned relationship of the edges 130 in the neighboring cycles 120. In such an example and as previously disclosed, the control module 530 may assign values to the edges 130 of the neighboring cycles 120 based on the associated relationship and then sum up the values of the edges 130 in each of the neighboring cycles 120. The control module 530 may compare the sum of each of the neighboring cycles 120 to a predetermined value and if the sums equal the predetermined value, the control module 530 may conclude that the neighboring cycles 120 are valid. In the case that the control module 530 determines that the sum of one or more of the neighboring cycles 120 do not equal the predetermined value, the control module 530 may determine that the one or more of the neighboring cycles 120 have an inconsistency and thus, are invalid.

In one embodiment, the control module 530 includes instructions that, when executed by the processor(s) 510, cause the processor(s) 510 to identify, in response to at least one of the cycles 120 being invalid, one of the three or more edges 130 that is likely to be invalid. As an example, upon determining that a cycle 120 is invalid, the control module 530 may compare the maximum probability values associated with the edges 130 of the cycle 120 determined to be invalid. The control module 530 may then select the edge 130 with the lowest maximum probability value compared to the other edges as the edge 130 that is likely to be invalid. As another example, the control module 530 may determine that two neighboring cycles 120 are invalid. The control module 530 may then identify and select the edge 130 that is shared by the neighboring cycles 120 as the edge 130 that is likely to be invalid.

In one embodiment, the control module 530 includes instructions that, when executed by the processor(s) 510, cause the processor(s) 510 to discard the edge 130 that is likely to be invalid. As such, the control module 530 may delete the edge 130 from the frame graph 110 before generating the lane graph 310.

In one embodiment, the control module 530 includes instructions that, when executed by the processor(s) 510, cause the processor(s) 510 to select another relationship option 150 for the edge 130 that is likely to be invalid and determine validity of the associated cycle 120 based on the invalid edge 130 having the other relationship option 150. In this embodiment, the control module 530 may assign another relationship option to the invalid edge 130 in place of the current relationship option. As an example, the control module 530 may reassign an invalid edge 130 that is currently ego to adjacent left. The control module 530 may then determine validity of the cycle 120 with the edge 130 having the newly assigned relationship option. The control module 530 may select the other relationship based on any suitable method.

In one embodiment, the control module 530 includes instructions that, when executed by the processor(s) 510, cause the processor(s) 510 to select another relationship option for the edge 130 that is likely to be invalid and determine validity of the associated cycle 120 based on the invalid edge 130 having the other relationship option.

In one embodiment, the control module 530 includes instructions that, when executed by the processor(s) 510, cause the processor(s) 510 to determine a best fit for at least a portion of the cycles 120 based on the three or more edges 130 of at least the portion of the cycles 120. As an example, the control module 530 may select one or more cycles 120 and solve for the possible relationship options of the edges 130 of the one or more cycles 120. The control module 530 may impose any suitable known constraints while solving for the possible relationship options of the edges 130. As such, the control module 530 determines the best fit when all the suitable known constraints associated with the frame graph are met. The control module 530 may solve for the best fit using a matrix equation as disclosed above in FIGS. 4A-4B. The control module 530 may solve the cycles 120 in a sequential manner, determining the possible relationship options for a first set of cycles 120 and then determining the possible relationship options for a second set of cycles 120 neighboring the first set of cycles 120 and constrained by the possible relationship options for the first set of cycles 120. The control module 530 may solve the cycles 120 sequentially until the control module 530 has completed solving all the cycles in the frame graph 110. The control module 530 may then generate the lane graph 310 based on the resolved frame graph.

Figure 6:
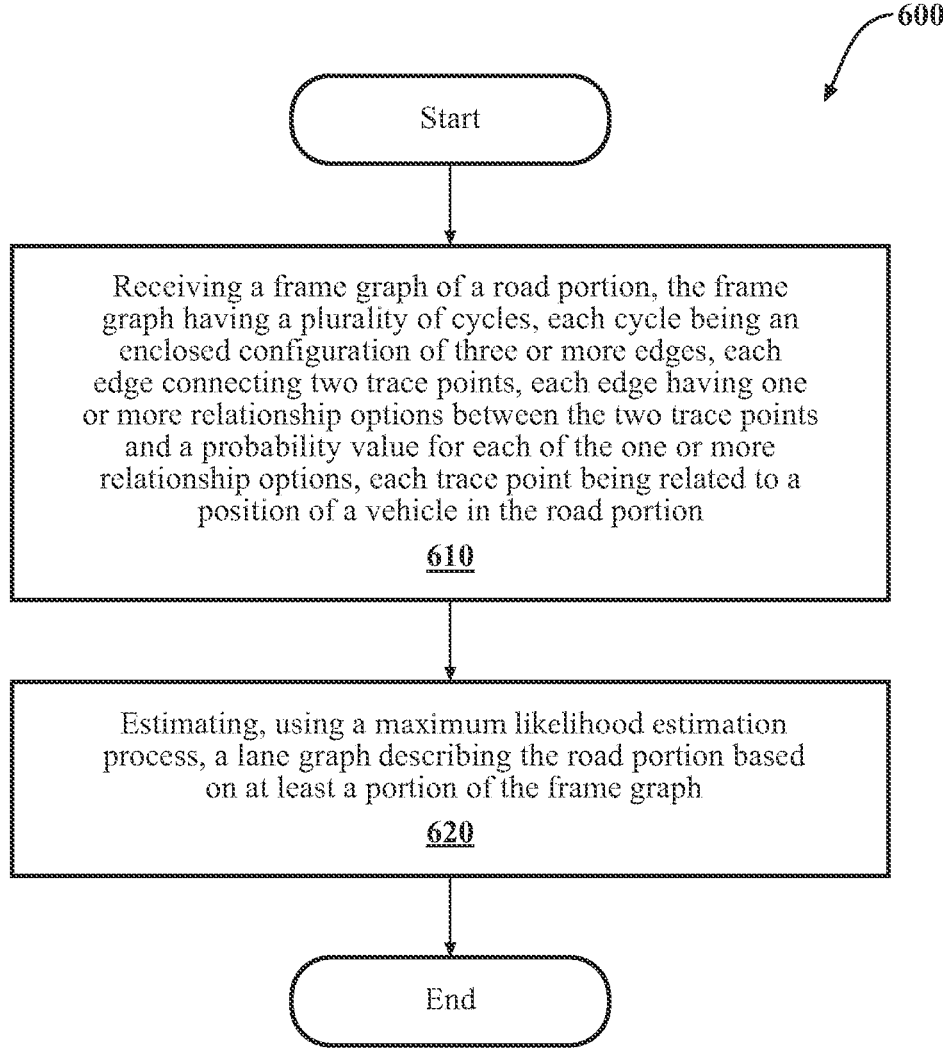
FIG. 6 is a flowchart illustrating one embodiment of a method associated with estimating a lane graph based on a frame graph.

FIG. 6 is a flowchart illustrating one embodiment of a method 600 associated with estimating a lane graph 310 based on a frame graph 110. The method 600 will be described from the viewpoint of the lane graph estimation system 100. However, the method 600 may be adapted to be executed in any one of several different situations and not necessarily by the lane graph estimation system 100.

At step 610, the control module 530 may cause the processor(s) 510 to receive a frame graph 110 of a road portion 102. The frame graph 110 has multiple cycles 120. Each cycle 120 is an enclosed configuration of three or more edges 130. Each edge 130 connects two trace points 140, 142, 144. Each edge 130 has one or more relationship options 150 between the two trace points 140, 142, 144 and a probability value 107, 108, 109 for each of the one or more relationship options 150. Each trace point 140, 142, 144 is related to a position of a vehicle in the road portion 102. As previously mentioned, the control module 530 may receive the frame graph 110 of the road portion 102 from any suitable entity capable of generating the frame graph 110.

At step 620, the control module 530 may cause the processor(s) 510 to estimate, using a maximum likelihood estimation process, a lane graph 310 describing the road portion 102 based on at least a portion of the frame graph 110. The control module 530 may apply any of the previously mentioned methods to generate the lane graph 310 based on the frame graph 110. As an example, the control module 530 may assign values to the edges 130 of one or more cycles 120 based on the various relationship options 150. The control module 530 may then sum up the values for each cycle 120 to determine whether the cycle 120 is valid or invalid. Upon identifying a cycle 120 as invalid, the control module 530 may identify the invalid edge 130 based on the probability values 107, 108, 109 associated with each edge 130. As another example, the control module 530 may identify the invalid edge 130 as the edge 130 shared by two neighboring cycles 120 that the control module 530 has determined to be invalid. The control module 530 may discard the invalid edge 130 or may assign another relationship option to the invalid edge 130 and re-determine the cycles 120. The control module 530 may generate the lane graph 310 based on the frame graph 110 with valid cycles 120. As another example, the control module 530 may apply a best fit method on the cycles 120 in the frame graph 110 to generate the lane graph 310. The best fit may be limited to the relationship options 150 and the possible combinations of the relationship options 150.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of ... and ..." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory storing machine-readable instructions that, when executed by the processor, cause the processor to:
  receive a frame graph of a road portion, the frame graph having a plurality of cycles, each cycle being an enclosed configuration of three or more edges, each edge connecting two trace points, each edge having one or more relationship options between the two trace points and a probability value for each of the one or more relationship options, each of the one or more relationship options including trace points in a same lane, trace points in adjacent lanes leftward, and trace points in adjacent lanes rightward, each trace point being related to a position of a vehicle in the road portion;
  estimate, using a maximum likelihood estimation process, a lane graph describing the road portion based on at least a portion of the frame graph; and
  operate a vehicle control system based on the lane graph, the vehicle control system being at least one of a steering system, a braking system, and a transmission system.

2. The system of claim 1, wherein the machine-readable instructions for estimating the lane graph further include instructions that when executed by the processor cause the processor to:
  determine validity of at least one of the plurality of cycles based on the three or more edges of the at least one of the plurality of cycles.

3. The system of claim 2, wherein the machine-readable instructions further include instructions that when executed by the processor cause the processor to:
  identify, in response to the at least one of the plurality of cycles being invalid, one of the three or more edges that is likely to be invalid; and
  discard the one of the three or more edges that is likely to be invalid.

4. The system of claim 2, wherein the machine-readable instructions further include instructions that when executed by the processor cause the processor to:
  identify, in response to the at least one of the plurality of cycles being invalid, one of the three or more edges that is likely to be invalid;
  select an other relationship option for the one of the three or more edges that is likely to be invalid; and
  determine validity of at least one of the plurality of cycles based on the one of the three or more edges that is likely to be invalid having the other relationship option.

5. The system of claim 1, wherein the machine-readable instructions for estimating the lane graph further include instructions that when executed by the processor cause the processor to:
  determine validity of at least one of the plurality of cycles based on the three or more edges of the at least one of the plurality of cycles and at least one neighboring cycle that shares at least one of the three or more edges.

6. The system of claim 1, wherein the machine-readable instructions for estimating the lane graph further include instructions that when executed by the processor cause the processor to:
  determine a best fit for at least a portion of the plurality of cycles based on the three or more edges of at least the portion of the plurality of cycles.

7. A method comprising:
  receiving a frame graph of a road portion, the frame graph having a plurality of cycles, each cycle being an enclosed configuration of three or more edges, each edge connecting two trace points, each edge having one or more relationship options between the two trace points and a probability value for each of the one or more relationship options, each of the one or more relationship options including trace points in a same lane, trace points in adjacent lanes leftward, and trace points in adjacent lanes rightward, each trace point being related to a position of a vehicle in the road portion;
  estimating, using a maximum likelihood estimation process, a lane graph describing the road portion based on at least a portion of the frame graph; and
  operating a vehicle control system based on the lane graph, the vehicle control system being at least one of a steering system, a braking system, and a transmission system.

8. The method of claim 7, wherein estimating the lane graph includes:
  determining validity of at least one of the plurality of cycles based on the three or more edges of the at least one of the plurality of cycles.

9. The method of claim 8, further comprising:
  identifying, in response to the at least one of the plurality of cycles being invalid, one of the three or more edges that is likely to be invalid; and
  discarding the one of the three or more edges that is likely to be invalid.

10. The method of claim 8, further comprising:
  identifying, in response to the at least one of the plurality of cycles being invalid, one of the three or more edges that is likely to be invalid;
  selecting an other relationship option for the one of the three or more edges that is likely to be invalid; and
  determining validity of at least one of the plurality of cycles based on the one of the three or more edges that is likely to be invalid having the other relationship option.

11. The method of claim 7, wherein estimating the lane graph includes:
  determining validity of at least one of the plurality of cycles based on the three or more edges of the at least one of the plurality of cycles and at least one neighboring cycle that shares at least one of the three or more edges.

12. The method of claim 7, wherein estimating the lane graph includes:
  determining a best fit for at least a portion of the plurality of cycles based on the three or more edges of at least the portion of the plurality of cycles.

13. A non-transitory computer-readable medium including instructions that when executed by a processor cause the processor to:
  receive a frame graph of a road portion, the frame graph having a plurality of cycles, each cycle being an enclosed configuration of three or more edges, each edge connecting two trace points, each edge having one or more relationship options, each of the one or more relationship options including trace points in a same lane, trace points in adjacent lanes leftward, and trace points in adjacent lanes rightward, each trace point being related to a position of a vehicle in the road portion;

estimate, using a maximum likelihood estimation process, a lane graph describing the road portion based on at least a portion of the frame graph; and operate a vehicle control system based on the lane graph, the vehicle control system being at least one of a steering system, a braking system, and a transmission system.

14. The non-transitory computer-readable medium of claim 13, wherein the instructions for estimating the lane graph further include instructions that when executed by the processor cause the processor to:

determine validity of at least one of the plurality of cycles based on the three or more edges of the at least one of the plurality of cycles.

15. The non-transitory computer-readable medium of claim 14, wherein the instructions further include instructions that when executed by the processor cause the processor to:

identify, in response to the at least one of the plurality of cycles being invalid, one of the three or more edges that is likely to be invalid; and discard the one of the three or more edges that is likely to be invalid.

16. The non-transitory computer-readable medium of claim 14, wherein the instructions further include instructions that when executed by the processor cause the processor to:

identify, in response to the at least one of the plurality of cycles being invalid, one of the three or more edges that is likely to be invalid;

select an other relationship option for the one of the three or more edges that is likely to be invalid; and determine validity of at least one of the plurality of cycles based on the one of the three or more edges that is likely to be invalid having the other relationship option.

17. The non-transitory computer-readable medium of claim 13, wherein the instructions for estimating the lane graph further include instructions that when executed by the processor cause the processor to:

determine validity of at least one of the plurality of cycles based on the three or more edges of the at least one of the plurality of cycles and at least one neighboring cycle that shares at least one of the three or more edges.

* * * * *